US012798928B2

(12) United States Patent
Wirtz et al.

(10) Patent No.: US 12,798,928 B2
(45) Date of Patent: Nov. 17, 2026

(54) LIFTING POINT

(71) Applicant: J.D. Theile GmbH & Co. KG, Schwerte (DE)

(72) Inventors: Jörg Wirtz, Schwerte (DE); Jörg Sokolla, Schwerte (DE); Martin Haverkamp, Iserlohn (DE)

(73) Assignee: J.D. Theile GmbH & Co. KG, Schwerte (DE)

( * ) Notice: Subject to any disclaimer, the term of this patent is extended or adjusted under 35 U.S.C. 154(b) by 571 days.

(21) Appl. No.: 18/483,778

(22) Filed: Oct. 10, 2023

(65) Prior Publication Data

US 2024/0124269 A1 Apr. 18, 2024

(30) Foreign Application Priority Data

Oct. 12, 2022 (DE) ..................... 20 2022 105 774.5

(51) Int. Cl.
*B66C 1/66* (2006.01)

(52) U.S. Cl.
CPC ...................................... *B66C 1/66* (2013.01)

(58) Field of Classification Search
CPC .......... B66C 1/66; F16B 45/002; F16B 45/00; F16B 35/06; F16G 15/08
See application file for complete search history.

(56) References Cited

U.S. PATENT DOCUMENTS 5,064,326 A * 11/1991 Davis .................... G09F 3/0317 411/374
6,679,648 B2 1/2004 Benecke
(Continued)

FOREIGN PATENT DOCUMENTS

DE 20121118 U1 5/2002
DE 10164593 A1 7/2003
(Continued)

OTHER PUBLICATIONS

Pending U.S. Appl. No. 18/360,314, filed Jul. 27, 2023, inventors Foitzik et al. [Per MPEP 609.07, copy not provided as this is available in the USPTO system].
(Continued)

*Primary Examiner* — Stephen A Vu

(74) *Attorney, Agent, or Firm* — Polson Intellectual Property Law P.C.; Margaret Polson; Christopher Sylvain

(57) ABSTRACT

An attachment point with a lower part having a threaded bolt for connecting the attachment point to an object to be handled, and with an upper part which is rotatable relative to the lower part and connected thereto. The upper part has a connecting element for connecting a lifting, attachment or lashing means. One of the two parts as an outer bearing part encloses at least one axial portion of the other part as an inner bearing part. The attachment point has coupling means for torque-locking coupling of the upper and lower parts for the purpose of tool-free connection of the attachment point to the object. The coupling means comprises a radially adjustable coupling bolt held in the outer bearing part, and, on the inner bearing part, at least one rotary driving contour accessible in the radial direction and acting in the circumferential direction, with which contour the actuated coupling bolt engages to bring about the torque-locking coupling of the upper and lower parts.

19 Claims, 3 Drawing Sheets

(56) References Cited

U.S. PATENT DOCUMENTS

| | | | | |
|---|---|---|---|---|
| 7,065,952 | B2 | 6/2006 | Benecke | |
| 7,231,759 | B2 | 6/2007 | Benecke | |
| 7,445,414 | B1 * | 11/2008 | Notaro | F16B 23/0007<br>411/432 |
| 9,051,993 | B2 | 6/2015 | Benecke | |
| 10,465,732 | B2 * | 11/2019 | Polidori | H01R 4/5091 |
| 10,710,846 | B2 | 7/2020 | Redder | |
| 10,836,304 | B2 * | 11/2020 | Taberner | F16B 41/005 |
| 11,287,223 | B2 * | 3/2022 | Stewart | B62D 27/065 |
| 2021/0114844 | A1 | 4/2021 | Foitzik | |
| 2023/0202805 | A1 | 6/2023 | Müer | |

FOREIGN PATENT DOCUMENTS

| | | | |
|---|---|---|---|
| DE | 202012100764 | U1 | 4/2012 |
| DE | 202019002873 | U1 | 8/2019 |
| EP | 3263948 | A1 | 1/2018 |
| EP | 3736459 | A1 | 11/2020 |
| EP | 3494079 | B1 | 12/2021 |

OTHER PUBLICATIONS

Pending U.S. Appl. No. 18/450,090, filed Aug. 15, 2023, inventors Foitzik et al. [Per MPEP 609.07, copy not provided as this is available in the USPTO system].

Pending U.S. Appl. No. 18/484,698, filed Oct. 11, 2023, inventors Fröse et al. [Per MPEP 609.07, copy not provided as this is available in the USPTO system].

* cited by examiner

LIFTING POINT

RELATED APPLICATION

This application claims priority to German application 202022105774.5 filed Oct. 12, 2022, which is fully incorporated-by-reference herein BACKGROUND The disclosure relates to a lifting point—also referred to as an attachment point herein—with a lower part having a threaded bolt as connection means for connecting the attachment point to an object to be handled with it, and with an upper part that can be rotated relative to the lower part and is connected thereto, wherein the upper part has a connection element for connecting a lifting, attachment or lashing means to the attachment point.

Such attachment points, whether they are in the form of eyebolts or swivels, are typically used for lifting or lashing objects. The attachment points are connected with their lower part to the object to be handled. Several attachment points are typically used for the attachment of a corresponding lifting gear in order to handle such an object. Attachment points that are not intended to be permanently attached to an object to be handled generally have a threaded bolt as part of the lower part, which is screwed into a complementary internally threaded bore of the object to be handled, to clamp the attachment point object. Depending on the desired use, an eyelet or clevis can be provided as a connecting element of the upper part for connecting a lifting, attachment or lashing device. In both cases, the connection element can be designed such that a lifting, attachment or lashing device can be connected directly thereto or that a hook eyelet is inserted into such a connection element, to which the lifting, attachment or lashing device is then connected.

The upper part of such an attachment point can be rotated relative to the lower part so that when a pulling or tensile force is applied to the connection element of the upper part, the connection element and thus the upper part can be aligned in the pulling direction. The upper part can be rotated in relation to the lower part in different ways.

To connect such an attachment point to an object to be handled therewith, the upper side of the lower part typically has a rotary driving contour. This can be designed as an outer contour or as an inner contour. The purpose of this contour is to allow the attachment point to be tightened to the object to be handled using a suitable tool. In many cases, especially those in which such an attachment point does not remain permanently on an object to be handled, such attachment points are connected to the object to be handled and tightened to it without an additional tool. The upper part, which can be rotated relative to the lower part, is used for this purpose with its connecting element then used as an actuating handle. In such attachment points, the rotational mobility between these two parts of the attachment point is eliminated for the purpose of torque transmission from the upper part to the lower part, so that the upper part is coupled to the lower part in a torque-locking manner for this purpose. Such an attachment point is known from EP 3736459 B1. With this attachment point, the upper part can be adjusted in the axial direction relative to the lower part against the force of a restoring element. The lower part has a conventional hexagonal head as the rotary driving contour. In order to be able to engage the upper part with the lower part in a torque-locking manner, rotary driving cams that protrude in the direction of the inside are formed on the eyelet bow that provides the connection element of this attachment point. The distance between the mutually facing surfaces of these rotary driving cams corresponds to the distance between two mutually opposite rotary driving surfaces of the rotary driving contour of the lower part. When the upper part is in a position relative to the lower part, in which the rotary driving surfaces of the rotary driving cams are aligned with those of the rotary driving contour of the lower part in the axial direction, the two complementary rotary driving contours can be engaged by an axial movement of the upper part relative to the lower part. Then the attachment point can easily be tightened to the object to be handled by turning the upper part accordingly. Since this coupling movement of the upper part takes place against the force of a restoring element, the upper part, when released by the user, is brought back into its freely rotatable position relative to the lower part.

This concept of a rotationally driving coupling of the upper part with the lower part cannot be transferred to attachment points in which the upper part and the lower part are connected to one another by roller bearing bodies. The roller bearing bodies prevent axial adjustments between the upper part and the lower part. In order to achieve a torque-locking coupling between the upper part and the lower part with such an attachment point, it has been proposed in EP 3494079 B1 to provide a locking pin. The locking pin extends through the entire base body of the rotatable upper part. This locking pin can be pivoted by 180 degrees between two rotational end positions, with the axis of rotation of the locking pin running transversely to the axis of rotation of the upper part relative to the lower part. A recess is made in the middle portion of the locking pin. The depth of the recess extends in the axial direction in the two rotational end positions of the locking pin. The upper side of the lower part has a slot-shaped recess, which provides a rotary driving contour, into which the locking pin engages in one of its end positions. This is the case when a rotary driving coupling between the upper part and the lower part is desired. In its other end position, the locking pin does not engage in the rotary driving contour of the lower part provided by the slot-shaped recess, which is why in this position the upper part can be freely rotated relative to the lower part. The required adjustability of the locking pin with its adjusting lever creates protrusions on the outside of the attachment point. In addition, the adjusting lever, which is necessarily kept flat for this reason, is sometimes not always easy to grasp, especially when wearing gloves. Furthermore, the locking pin of the upper part must be aligned in the axial direction with the axial extent of the rotary driving slot of the lower part in order to be able to bring about the torque-locking coupling. Sometimes it is not easy to find this positioning of the upper part to the lower part. In addition, it would be desirable for handling-related safety considerations if it were possible to decouple the rotational drive of the upper part and lower part as in the subject matter of EP 3736459 B1.

In DE 202019002873 UI, it is also not possible to decouple the rotational drive of the upper part and lower part as in the subject matter of EP 3736459 B1. With this attachment point, a coupling bolt is held in its release position by means of a handle. The coupling bolt is spring-loaded. If the handle and thus the coupling bolt are released, the spring relaxes and presses the coupling bolt into a blind bore provided in the radial direction when the lower part is in the appropriate position relative to the upper part.

The foregoing examples of related art and limitations therewith are intended to be illustrative and not exclusive. Other limitations will become apparent to those skilled in the art upon a reading of the specification and a study of the drawings.

SUMMARY

The following embodiments and aspects thereof are described and depicted in conjunction with systems, tools, and methods which are meant to be illustrative and not limiting in scope. In various embodiments, one or more problems have been reduced or eliminated, while other embodiments are directed to other improvements.

Proceeding from this background, an aspect of the disclosure is to further develop an attachment point in view of the above-mentioned requirements. This is provided by an attachment point comprising a lower part having a threaded bolt for connecting the attachment point to an object to be handled, and an upper part having a connecting element for connecting a lifting, attachment or lashing device to the attachment point, with the upper part connected to and rotatable relative to the lower part, wherein one of the two parts is an outer bearing part and the other part is an inner bearing part, and the outer bearing part encloses at least one axial section of the inner bearing part for mounting the upper part relative to the lower part, wherein the attachment point has at least one coupling device configured to bring about a torque-locking coupling of the upper and lower parts for tool-free connection of the attachment point to the object to be handled, wherein the coupling device comprises a coupling bolt which is adjustable in the radial direction and held in the outer bearing part, and, on the side of the inner bearing part, at least one rotary driving contour which is accessible in the radial direction and acts in the circumferential direction, and at least one restoring element acts on the coupling bolt such that: when the coupling bolt is actuated to bring about the torque-locking coupling of the upper and lower parts, the coupling bolt is moved against the force of the restoring element and a coupling portion of coupling bolt engages the rotary drive contour of the inner bearing part, and when the coupling bolt is not actuated, the upper part is freely rotatable relative to the lower part.

In this attachment point, a coupling bolt that can be adjusted in the radial direction is provided as the coupling means. The coupling bolt may also be referred to as a coupling pin. Regardless of the specific design of the attachment point, namely whether the upper part encloses the lower part with a portion or vice versa, the coupling bolt is held in the outer part—the outer bearing part. Complementary to the coupling bolt, the other part of the attachment point—the inner bearing part—has at least one rotary driving contour that is open outwards in the radial direction. Such rotary driving contour is typically designed as a recess, but can also be designed in the form of a rotary driving cam and thus as a protruding contour. The coupling bolt can be manually adjusted in the radial direction for coupling the upper part relative to the lower part against the force of at least one restoring element. The restoring element ensures that when the coupling bolt is no longer actuated, the coupling bolt is in its position in which the upper part can be rotated freely relative to the lower part. The radial adjustability of the coupling bolt makes it easier, especially if the complementary rotary driving contour of the inner bearing part is designed as a rotary driving recess, to find the engagement position of the coupling portion of the coupling bolt in such a rotary driving contour, which then takes place more or less automatically. In order to achieve this, the coupling bolt is pushed in manually until its coupling portion makes contact with the outer surface of the inner bearing part. If the upper part is then rotated in relation to the lower part, the manual force acting on the coupling bolt causes its coupling portion to automatically engage into a rotary driving recess when both parts are positioned correspondingly to one another.

A particular advantage of such a coupling means is that an attachment point equipped therewith can also have several coupling devices of this type which can be actuated independently of one another, for example at two positions opposite one another with respect to the axis of rotation of the upper part. To tighten the attachment point with an object to be handled, it is completely sufficient if the coupling is provided with a single such coupling device. After all, only forces of about 20 Nm have to be applied for hand-tight tightening between such an attachment point and an object to be handled.

Another advantage of this attachment point is that this coupling concept can be used for attachment points of various designs, in particular also attachment points where the upper part and lower part are supported by roller bearing bodies. A further advantage is the low manufacturing cost required to realize such a coupling means.

It is also advantageous that the coupling bolt is engaged via its coupling portion with the lateral surface of the inner bearing part which faces outwards in the radial direction. For this reason, the inner bearing part, if this is the lower part, may well have a rotary driving contour on its upper side suitable for tool engagement. This is used when the attachment point is to be clamped to an object to be handled with higher forces, which may be the case when such an attachment point is intended to be permanently connected to an object to be handled. The connection can then be made using a tool, such as a torque wrench for example, in order to bring about the tightening with the specified preloading force.

In order to guide the coupling bolt, one embodiment provides a guide bore that extends through a portion of the outer bearing part. Such a guide bore can be provided at any point along the circumferential direction of the outer bearing part. To hold the coupling bolt in its initial position, in which the upper part can be rotated freely relative to the lower part, it is provided according to a preferred embodiment that the coupling bolt has a stop surface facing away from its coupling portion. The stop surface can be provided by a stepped reduction in the diameter of the coupling bolt. In the direction of the coupling portion, the diameter of the coupling bolt can remain the same or also be reduced again via a step if the coupling portion is to have a smaller diameter than the stop surface. The stop surface of the coupling bolt works together with a counter stop of the outer bearing part. In this default position, the coupling bolt is held by the at least one restoring element with the stop surface acting under preload against the counter stop of the outer bearing part. The counter stop may be part of the guide bore. It is also possible for the counter stop to be provided by a wall portion of the outer bearing part that faces the inner bearing part and borders the inside opening of the guide bore.

Preferably, the guide bore is stepped and includes a radially inner portion with a smaller diameter. The inner portion serves to guide the coupling bolt, which can be adjusted in the radial direction. Therefore, the diameter of the inner portion of the guide bore and the diameter of the portion of the coupling bolt guided therein are matched to one another accordingly. Adjoining the inner portion, a radially outer portion of the guide bore has a larger diameter. This creates an annular gap surrounding the coupling bolt in this section. The at least one restoring element, designed for example as a helical compression spring, is typically arranged in this gap. According to a preferred embodiment, the coupling bolt has an actuating handle at its user-actuating end. The actuating handle serves to facilitate the operability of the coupling bolt, for example because it increases the diameter of the coupling bolt and thus provides an ergonomically more favorable actuating surface. According to one embodiment, the actuating handle is provided by an actuating cap placed on the end of the coupling bolt. The end face of such an actuating cap, which faces radially inward, preferably serves as a support surface for the at least one restoring element, such as a helical compression spring for example. The restoring element is then supported on the one hand on the end face of the actuating cap and on the other hand on the stepped shoulder located in the guide bore. The actuating cap may be non-positively connected to the coupling bolt in the axial direction, for example by an adhesive connection. According to a preferred embodiment, the guide bore transitions into a recessed grip. The actuating handle is located in the recessed grip and does not protrude beyond the outer lateral surface of the outer bearing part in the radial direction. The outer diameter of the recessed grip and its depth are designed so that the user can press in the coupling bolt with a finger, for example the thumb.

The attachment point preferably has a plurality of rotary driving contours, for example rotary driving recesses, arranged at equal angular distances from one another. A torque-locking coupling between the upper part and the lower part can then be brought about in different rotational positions of these two parts in relation to one another. Even though self-finding is possible with the coupling means described above, some embodiments further provide that the inner bearing part carries markings corresponding to a respective rotary driving contour for identifying the one or more positions of the rotary driving contours. These markings can be on a locking ring that closes a gap between the inner bearing part and the outer bearing part.

In an embodiment of the attachment point with an eyelet as a connecting element, it is considered advantageous if the longitudinal extent of the coupling bolt is arranged transversely to the plane of the eyelet. In such a case, two diametrically opposed coupling devices are typically provided on the outer bearing part. This is particularly useful for ergonomic reasons in designs where the external bearing part is the upper part of the attachment point.

In addition to aspects and embodiments described above, further aspects and embodiments will become apparent by reference to the drawings, wherein like reference numerals generally designate corresponding structures in the several views.

BRIEF DESCRIPTION OF THE DRAWINGS

Example embodiments according to the disclosure are described below with reference to the attached drawings, wherein.

Figure 1:
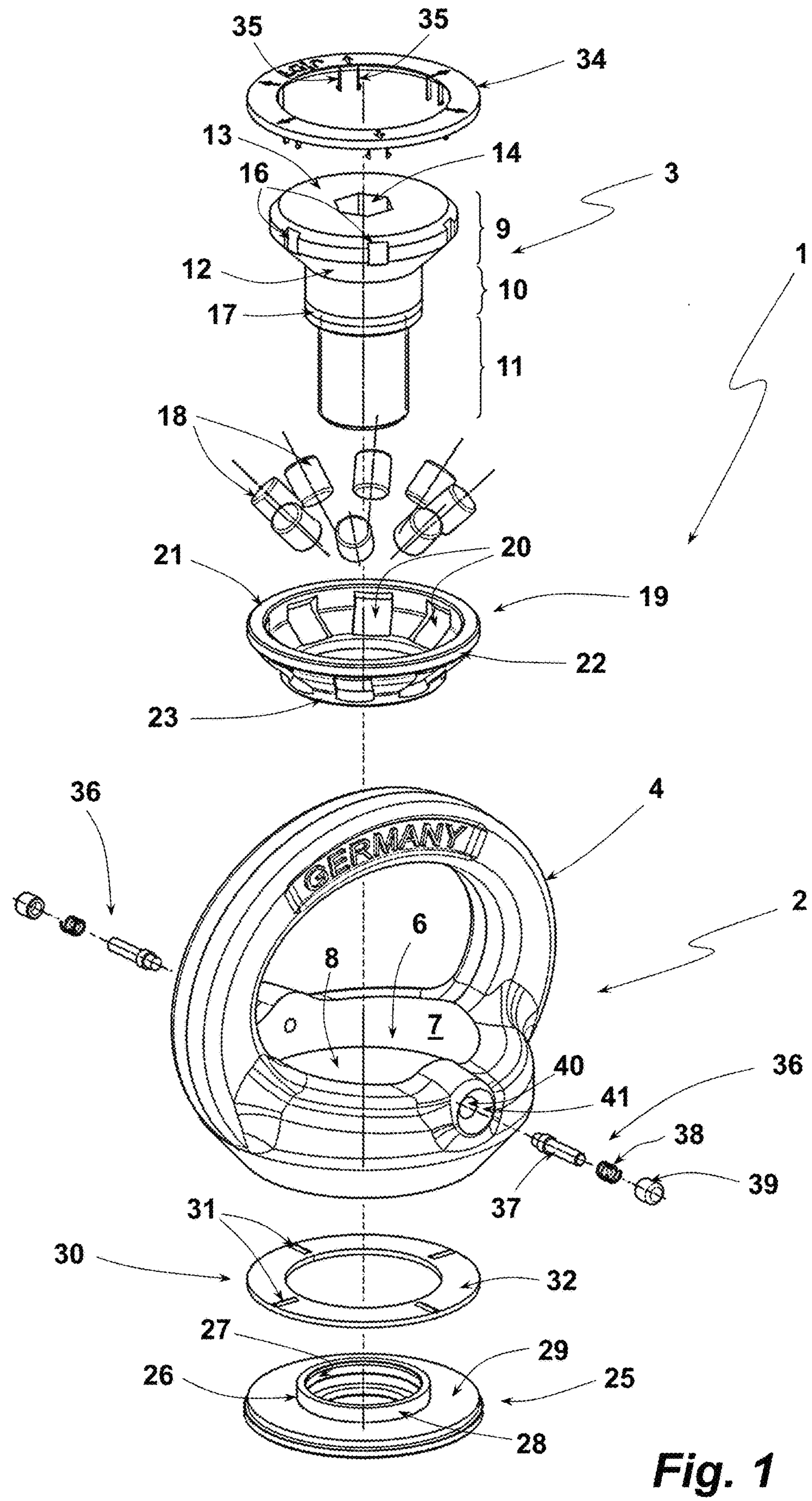
FIG. 1 shows a perspective view of an attachment point with components thereof depicted in explosion.

It is to be understood that the invention is not limited in application to the details of particular arrangements shown in the drawings, since the invention is capable of other embodiments. Embodiments and figures disclosed herein are to be considered illustrative rather than limiting.

DETAILED DESCRIPTION

An attachment point 1 comprises an upper part 2 and a lower part 3. The upper part 2 has an eyelet bow 4 as a connecting element for connecting a lifting, attachment or lashing device. The eyelet bow 4 is formed onto a ring-shaped base body 5. The ring-shaped base body 5 encloses a lower part receptacle 6 constructed as an opening. The wall forming the inside of the base body 5 and enclosing the lower part receptacle 6 comprises an upper cylindrical wall portion 7 and a bearing surface 8 adjoining it. The bearing surface 8 is conically tapered in the direction facing away from eyelet bow 4. The conical taper is straight in the illustrated embodiment.

The lower part 3 has a head portion 9, a shaft portion 10 and a threaded bolt 11. The threaded bolt 11 of the attachment point 1 represents its connection means for connecting the attachment point 1 to an object to be handled.

The head portion 9 has a bearing surface 12 on the underside and thus pointing in the direction of its threaded bolt 11. This is tapered at the same angle and in the same direction as the bearing surface 8 of the upper part 2. The bearing surface 12 is formed by a lateral surface portion of the head portion 9 protruding in radial direction relative to the shaft portion 10. A rotary driving contour 14 designed as a hexagon is provided in the upper end face 13 of the lower part 3, which is designed in principle as a screw bolt. A plurality of rotary driving recesses 16 arranged at the same angular distance from one another are introduced in the radially facing outer side 15 of the head portion 9. The recesses 16 are designed as grooves open at the ends in the axial direction. The shaft portion 10 carries a locking bead 17 running all the way around.

Cylindrical roller bearing bodies 18, which are arranged and guided in a bearing body cage 19, serve to support the rotational mobility of the upper part 2 relative to the lower part 3. For this purpose, the bearing body cage 19 has a number of rolling element receptacles 20 corresponding to the number of rolling bearing bodies 18. The bearing body cage 19 has a positioning ring 21 on its upper side. The radial outer side 22 of the positioning ring 21 is supported on the wall portion 7 of the upper part 2. The outer contour of a lower positioning ring 23 is shaped to engage in the transition of the bearing surface 8 into a radially inwardly directed projection 24 (see FIG. 3).

Part of the lower part 3 is a closure body 25 designed in the manner of a disk, which is positively connected to the shaft portion 10 of the lower part 3 in the axial direction. For this purpose, the closure body 25 has a circumferential locking wall 26 and the inner side of the wall 26, which faces towards the shaft portion 10, has a locking groove 27 at a position complementary to the locking bead 17. The locking wall 26 extends, starting from the disk-shaped base body of the closure body 25, in the axial direction in the direction of the head portion 9 of the lower part 3. The outer side 28 of the locking wall 26, which faces outwards in the radial direction, delimits the inside of a bearing surface 29. A needle bearing 30 is located thereon. The needle bearing 30 is shown only schematically and in an actual configuration has more than just the four rolling elements 31 shown. The rolling elements 31 are held in a cage 32. Overall, the needle bearing 30 can be handled and installed without any problems. The underside of the upper part 2 has a bearing surface 33 which faces towards the closure body 25 and provides the complimentary bearing surface to the bearing surface 29 (see FIG. 3).

A locking ring 34 is used to close an annular gap between the outside 15 of the head portion 9 of the lower part 3 and the cylindrical wall portion 7 of the upper part 2. For the purpose of assembly, latching webs 35 arranged in pairs with one another are formed on the underside of the locking ring 34. The latching heads of paired latching webs 35 point away from one another. The latching webs 35 of a pair of latching webs extend through a rotary driving recess 16 in the axial direction and the latching heads thereof engage behind such a rotary driving recess 16 for locking the locking ring 34 on the head portion 9 of the lower part 3 on the underside. As a result, the locking ring 34 is connected to the lower part 3 in a torque-locking manner. The upper side of the locking ring 34 has identification arrows, which indicate the positions of the rotary driving recesses 16 to a user.

The rotary driving recesses 16 of the lower part 3 allow the attachment point 1 to be hand-tightly connected to an object to be handled by means of its upper part 2 without using tools. To achieve such a rotary drive for connecting the attachment point 1 to an object to be handled or for detaching the attachment point 1 from such an object, the upper part 2 is equipped in the area of its annular base body 5 with two coupling device 36 which can be actuated independently of one another. Each coupling device 36 comprises a coupling bolt 37, a compression spring 38 as a restoring element, and an actuating cap 39. The end face of the actuating cap 39 acts against the force of the compression spring 38 when the coupling device 36 is actuated to engage the tip of the coupling bolt 37 in a rotary driving recess 16. An actuated coupling device 36 is thus reset by the compression spring 38. The coupling bolts 37 are each guided in a radially aligned guide bore 40 of the upper part 2. The actuating cap 39 is located in a recessed grip 41, which in the illustrated embodiment is a funnel-shaped enlargement of the guide bores 40. Such a recessed grip 41 is useful so that no actuating element protrudes beyond the outer lateral surface of the base body 5 of the lower part 3.

Figure 2:
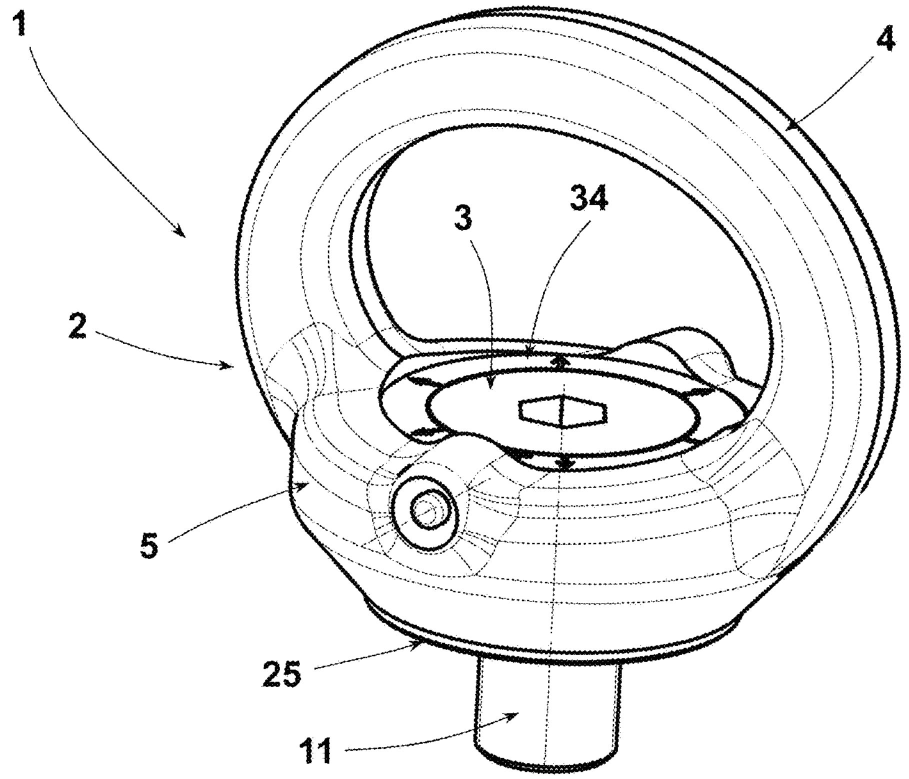
FIG. 2 shows the attachment point of FIG. 1 in its assembly.

FIG. 2 shows the assembled attachment point 1 and illustrates its compact form.

Figure 3:
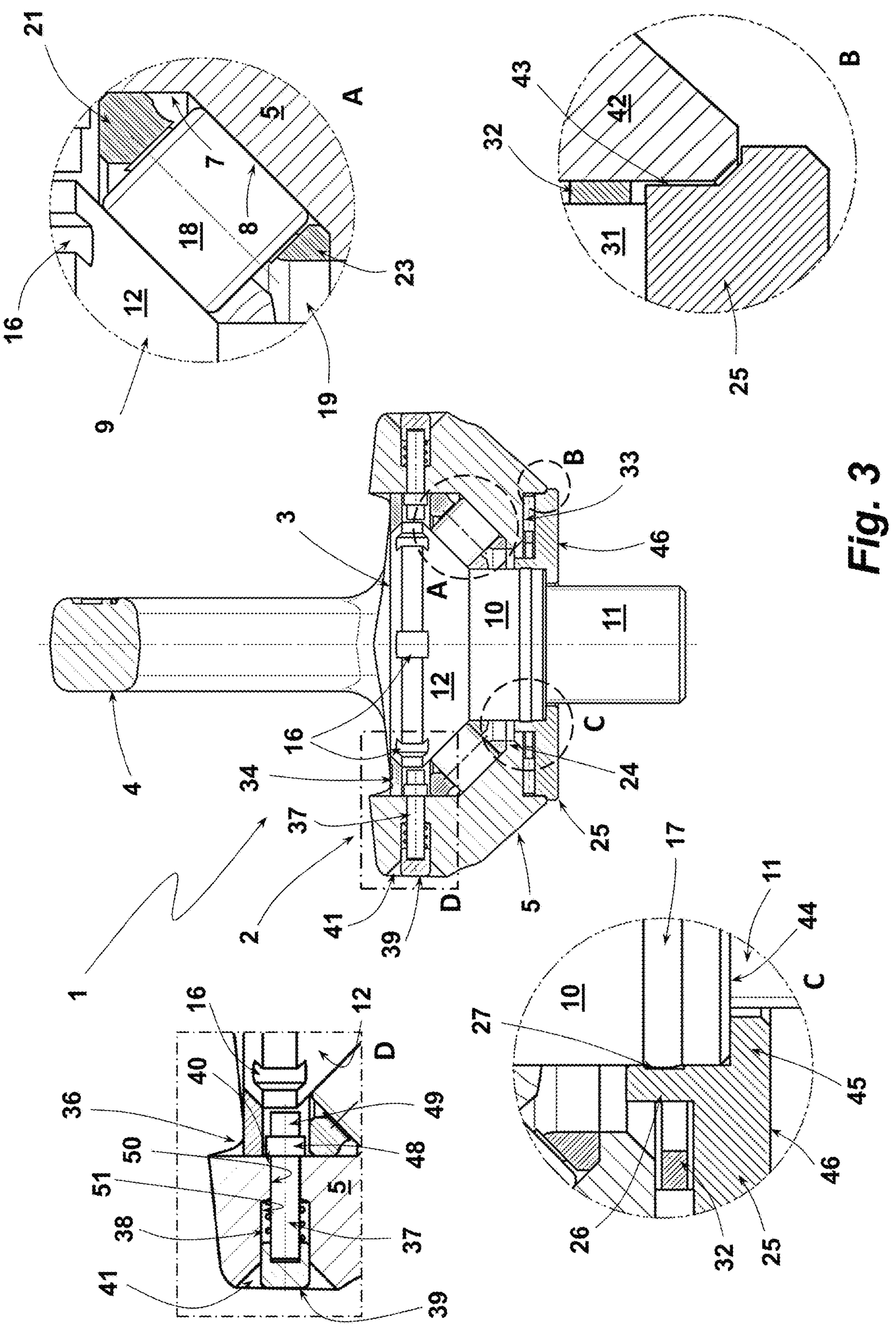
FIG. 3 shows a longitudinal sectional view through the assembled attachment point of FIG. 2 with enlarged detail views A, B, C, and D.

The rotatable mounting of the upper part 2 and lower part 3 can be seen in the sectional view of FIG. 3 as an assembly of the individual elements described for FIG. 1. Details are highlighted with enlarged detail views. The detail view A shows the cylindrical roller bearing bodies 18 arranged in their bearing body cage 19 between the two positioning rings 21, 23. The roller bearing bodies 18 rest against the bearing surface 12 as part of the head portion 9 of the lower part 3. The complementary bearing surface of the upper part 2 is formed by the bearing surface 8. Both bearing surfaces 8, 12 are inclined at 45 degrees relative to the axis of rotation of the upper part 2 relative to the lower part 3. This mounting of the upper part 2 in relation to the lower part 3 allows a particularly high power transmission as a result of the use of non-spherical rolling bodies, namely through the use of cylindrical rolling bearing bodies 18 in the example embodiment shown. As a result of the described inclination of the bearing surfaces 8, 12 and the longitudinal axis of the roller bearing body 18 aligned parallel thereto, the upper part 2 can rotate relative to the lower part 3 under pulling stress in both the axial and in the radial direction. If this bearing shows play or gains play as a result of wear, this is of no importance for the intended use of the attachment point 1. Finally, the roller bearing bodies 18 are held and guided in the roller body cage 19, so that their alignment is retained even if there is bearing play.

The needle bearing 30 inserted between the bearing surface 29 of the closure body 25 and the bearing surface 33 of the upper part 2 is used for the rotatable support of the upper part 2 relative to the closure body 25 as part of the lower part 3, especially in the case of transverse load stresses acting on the connecting element of the upper part 2. A tilting of the upper part 2 in relation to the lower part 3, which is possible when there is a transverse load on the connecting element of the attachment point 1 if there is play in the bearing, is effectively intercepted in this way and thus permanent rotational mobility of the upper part 2 in relation to the lower part 3 is also ensured at such loads. The base body 5 of the upper part 2 carries a downwardly protruding annular extension 42 (see detail view B). This annular extension 42 encloses the upper portion of the disk-like closure body 25 radially on the outside and forms a labyrinth seal 43 therewith while leaving a movement gap. This prevents the penetration of contaminants into the needle bearing 30 or also into the bearing provided by the rolling bearing bodies 18. For this purpose, a portion of the closure body 25 engages under the lower end of the ring extension 42.

The form fit acting in the axial direction between the closure body 25 and the shaft portion 10 of the lower part 3 is shown in detail view C. The locking bead 27 formed on the outside of the shaft portion 10 is positioned in the locking groove 27 of the locking wall 26. The shaft portion 10 forms a stop shoulder 44 in the transition to its threaded bolt 11. A stop extension 45 of the closure body 25 engages under the stop shoulder 44. This defines the assembly position in the axial direction of the closure body 25 on the shaft portion 10 of the lower part 3. At the same time, this protects the end of the thread of the threaded bolt 11 in the direction of the stop shoulder 44 against transverse load stress and a notch effect associated therewith. In the axial direction, the underside of the closure body 25 is at a distance from the stop shoulder 44 at which the thread of the threaded bolt 11 ends.

The underside of the closure body 25 forms an attachment surface 46 with which the attachment point 1 is tightened to the surface of an object to be handled.

Figure 4:
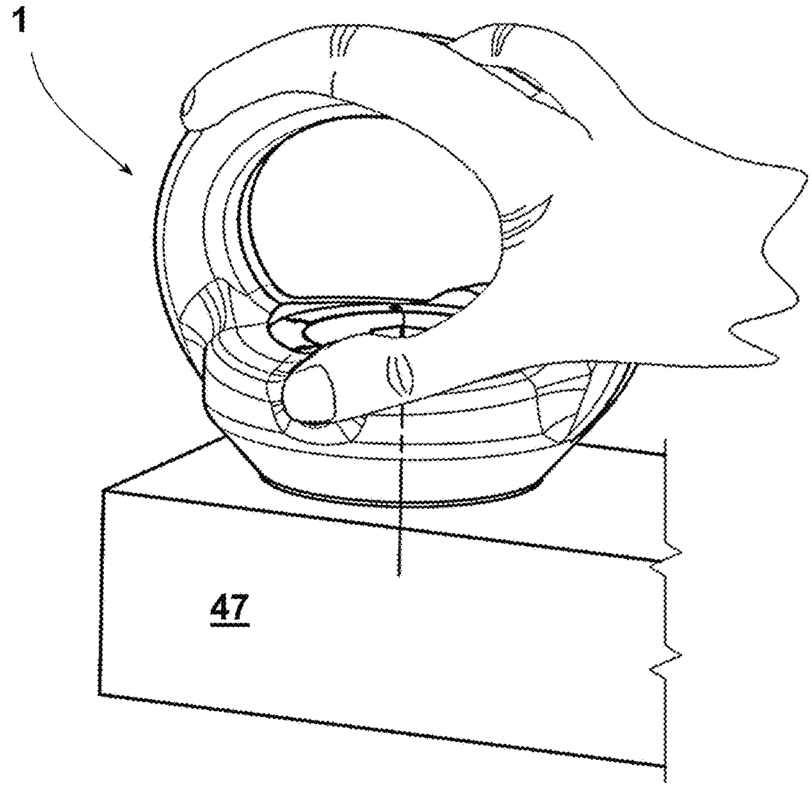
FIG. 4 shows the attachment point of the above figures during the process of connecting same to an object to be handled, which object is depicted schematically.

If only hand-tight tightening is required, the attachment point 1 may be connected to an object 47 to be handled (which is shown schematically as a cuboid in FIG. 4) by actuating one or both coupling devices 36 so that the end portion of at least one coupling bolt 37 engages in a rotary driving recess 16 of the lower part 3, thereby coupling the upper part 2 to the lower part 3 in a torque-locking manner, and then rotating the upper part 2. FIG. 4 shows the process of hand-tight connection of the attachment point 1 to the object 47. The easy and ergonomically advantageous operation of the attachment point is clear from this illustration. When the actuating cap 39 is released, the coupling bolt 37 returns back to its initial position as a result of the energy stored in the return spring, which is designed as a helical compression spring 38 in this example, such that the upper part 2 can then be freely rotated in relation to the lower part 3 again. If tightening with higher forces is desired, the lower part 3 can be further tightened to the object 47 by using a tool and the rotary driving contour 14 in the upper end face 13 of the head portion 9.

Detail view D shows a coupling device 36. In addition to the elements described above, the coupling bolt 37 carries a stop acting on the cylindrical wall portion 7 of the lower part receptacle 6. This stop is provided by a circumferential projection 48. The tip portion of the coupling bolt 37 on the inside in the radial direction forms the coupling portion 49 which, when the coupling device 36 is actuated by pressing the coupling bolt 37, engages in a rotary driving recess 16 in the head portion 9 of the lower part 3. The guide bore 40 has an inner portion 50 and an outer portion 51. The diameter of the inner portion 50 is smaller than that of the outer portion 51. A step forms the transition between the two portions 50, 51.

While several aspects and embodiments have been discussed herein, those persons skilled in the art will recognize numerous possible modifications, permutations, additions, combinations and sub-combinations therefor, without these needing to be specifically explained or shown within the context of this disclosure. The claims should therefore be interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown or described, or portions thereof, but it is recognized that various modifications are possible within the scope of the invention. Thus, it should be understood that although the invention has been specifically disclosed by preferred embodiments and optional features, modification and variation of the concepts herein may be resorted to by those skilled in the art, and that such modifications and variations are considered to be within the scope of this invention as defined by the claims. Whenever a range is given in the specification, all intermediate ranges and subranges, as well as all individual values included in the ranges given are hereby incorporated into this disclosure. When a Markush group or other grouping is used herein, all individual members of the group and all combinations and sub-combinations possible of the group are hereby individually included in this disclosure. In general, the terms and phrases used herein have their art-recognized meaning, which can be found by reference to standard texts, references and contexts known to those skilled in the art. Any above definitions are provided to clarify their specific use in the context of the invention.

LIST OF REFERENCE NUMERALS

1 attachment point
2 upper part/outer bearing part
3 lower part/inner bearing part
4 eyelet bow
5 base body
6 lower part receptacle
7 wall portion
8 bearing surface
9 head portion
10 shaft portion
11 threaded bolt
12 bearing surface
13 end face
14 rotary driving contour
15 outer side
16 rotary driving recess
17 locking bead
18 roller bearing body
19 bearing cage
20 rolling element receptacle
21 positioning ring
22 outer side
23 positioning ring
24 projection
25 closure body
26 locking wall
27 locking groove
28 outer side
29 bearing surface
30 needle bearing
31 rolling elements
32 cage
33 bearing surface
34 locking ring
35 latching web
36 coupling device
37 coupling bolt
38 compression spring
39 actuation cap
40 guide bore
41 recessed grip
42 ring extension
43 labyrinth seal
44 stop step
45 stop extension
46 stop surface
47 object to be handled
48 projection
49 coupling portion
50 inner portion
51 outer portion

The invention claimed is:

1. An attachment point comprising:

a lower part having a threaded bolt for connecting the attachment point to an object to be handled, and an upper part having a connecting element for connecting a lifting, attachment or lashing device to the attachment point, wherein the upper part is connected to the lower part and rotatable relative to the lower part, wherein one of the two parts is an outer bearing part and another of the two parts is an inner bearing part, and the outer bearing part encloses at least one axial portion of the inner bearing part for mounting the upper part relative to the lower part, wherein the attachment point has at least one coupling device configured to bring about a torque-locking coupling of the upper part and the lower part for tool-free connection of the attachment point to the object to be handled, wherein the coupling device comprises a coupling bolt which is adjustable in a radial direction and held in the outer bearing part, and, on a side of the inner bearing part, at least one rotary driving contour which is accessible in the radial direction and acts in circumferential direction, and at least one restoring element acts on the coupling bolt such that:

when the coupling bolt is actuated to bring about the torque-locking coupling of the upper part and the lower part, the coupling bolt is moved against a force of the restoring element and a coupling portion of coupling bolt engages the rotary drive contour of the inner bearing part, and when the coupling bolt is not actuated to bring about the torque-locking coupling of the upper part and the lower part, the upper part is freely rotatable relative to the lower part.

2. The attachment point of claim 1, wherein the coupling bolt is guided in a radially-extending guide bore of the outer bearing part.

3. The attachment point of claim 1, wherein the coupling bolt has a stop surface facing away from the coupling portion, and the coupling bolt rests with the stop surface on a counter stop of the outer bearing part under preload when the coupling bolt is not actuated to bring about the torque-locking coupling of the upper part and the lower part.

4. The attachment point of claim 3, wherein the counter stop is provided by a wall of the outer bearing part facing towards the inner bearing part.

5. The attachment point of claim 3, wherein the stop surface of the coupling bolt is provided by a stepped diameter reduction of the coupling bolt.

6. The attachment point of claim 1, wherein the coupling bolt is guided in a radially-extending guide bore of the outer bearing part, wherein the guide bore is stepped and comprises an inner portion for guiding the coupling bolt and an outer portion adjoining the inner portion, with the inner portion arranged closer than the outer portion to the inner bearing part, wherein the inner portion has a smaller diameter than the outer portion due to a step formed in the guide bore, and wherein the at least one restoring element is arranged in an annular gap formed in the outer portion between an outer surface of the coupling bolt and an inner wall of the guide bore.

7. The attachment point of claim 6, wherein an end of the coupling bolt opposite the coupling portion is provided with an actuating handle.

8. The attachment point of claim 7, wherein the actuating handle is an actuating cap mounted on the end of the coupling bolt and non-positively connected thereto in an axial direction of the coupling bolt.

9. The attachment point of claim 8, wherein an end face of the actuating cap engages in the outer portion of the guide bore, and the at least one restoring element is supported on one end by the step of the guide bore and on another end by the end face of the actuating cap.

10. The attachment point of claim 9, wherein the restoring element is a helical spring.

11. The attachment point of claim 1, wherein:

the coupling bolt has a stop surface facing away from the coupling portion provided by a stepped diameter reduction of the coupling bolt, the outer bearing has a counter stop provided by a wall of the outer bearing part facing towards the inner bearing part, and the coupling bolt rests with the stop surface on the counter stop of the outer bearing part under preload when the coupling bolt is not actuated to bring about the torque-locking coupling of the upper part and the lower part.

12. The attachment point of claim 11, wherein:

the restoring element is a helical spring and the coupling bolt is guided in a radially-extending guide bore of the outer bearing part, the guide bore is stepped and comprises an inner portion for guiding the coupling bolt and an outer portion adjoining the inner portion, with the inner portion arranged closer than the outer portion to the inner bearing part, and the inner portion has a smaller diameter than the outer portion due to a step formed in the guide bore, an end of the coupling bolt opposite the coupling portion is provided with an actuating handle being an actuating cap mounted on the end of the coupling bolt and non-positively connected thereto in an axial direction of the coupling bolt, with an end face of the actuating cap engaging in the outer portion of the guide bore, and the helical spring is arranged in an annular gap formed in the outer portion of the guide bore between an outer surface of the coupling bolt and an inner wall of the guide bore, and the helical spring is supported on one end by the step of the guide bore and on another end by the end face of the actuating cap.

13. The attachment point of claim 1, wherein the restoring element is a helical spring.

14. The attachment point of claim 1, wherein the rotary driving contour of the inner bearing part is provided as an axially extending, open-ended groove.

15. The attachment point of claim 1, wherein the upper part is the outer bearing part and the lower part is the inner bearing part.

16. The attachment point of claim 15, wherein the lower part has a head portion and a shaft portion formed thereon, with the shaft portion having a smaller diameter than the head portion, and the at least one rotary driving contour is introduced as a rotary driving recess in an outer lateral surface of the head portion.

17. The attachment point of claim 1, wherein the inner bearing part is assigned at least one marking for identifying a position of the at least one rotary driving contour.

18. The attachment point of claim 17, wherein a locking ring carries the at least one marking on an upper side thereof, and the locking ring is connected in a torque-locking manner to the inner bearing part.

19. The attachment point of claim 18, wherein pairs of latching webs with latching heads pointing away from each other are formed on the locking ring, and, when the locking ring is connected to the inner bearing part, the latching heads of each pair of latching webs engage behind a respective rotary driving recess of the inner bearing part, wherein the rotary driving recess is formed as an open-ended groove and provides a respective rotary driving contour of the inner bearing part.

* * * * *